United States Patent [19]

Harrigal et al.

[11] Patent Number: 4,665,858
[45] Date of Patent: May 19, 1987

[54] MOUNTING BRACKET FOR RAILWAY VEHICLE COUPLERS

[75] Inventors: Ronald E. Harrigal, Washington, D.C.; James P. Chew, Jeannette, Pa.

[73] Assignee: American Standard Inc., North Hills, Pa.

[21] Appl. No.: 801,882

[22] Filed: Nov. 26, 1985

[51] Int. Cl.⁴ .............................................. B61L 15/00
[52] U.S. Cl. ...................................... 116/30; 116/202
[58] Field of Search ............... 73/129, 121; 116/28 R, 116/30, 202; 246/473 R; 213/75 R, 11 R, 1.3

[56] References Cited

U.S. PATENT DOCUMENTS

| 656,726 | 8/1900 | Pope | 116/30 |
| 2,641,686 | 6/1953 | Carruthers | 116/30 |
| 4,487,060 | 12/1984 | Pomeroy | 73/129 |
| 4,520,662 | 6/1985 | Schmid | 73/129 |
| 4,592,217 | 6/1986 | Fernandez et al. | 73/129 |

Primary Examiner—Stewart J. Levy
Assistant Examiner—Robert R. Raevis
Attorney, Agent, or Firm—J. B. Sotak

[57] ABSTRACT

An equipment mounting assembly including a reinforced L-shaped supporting bracket having a monitoring unit carried by the horizontal arm of the L-shaped supporting bracket. A dual-position carrier plate, secured to the vertical arm of the L-shaped supporting bracket, includes a first channel slide mount for carrying a flashing marker light unit when the assembly is clamped to the core holes of one type of railway car coupler and includes a second channel slide mount for carrying the flashing marker light unit when the assembly is clamped to the core holes of another type of railway car coupler.

7 Claims, 6 Drawing Figures

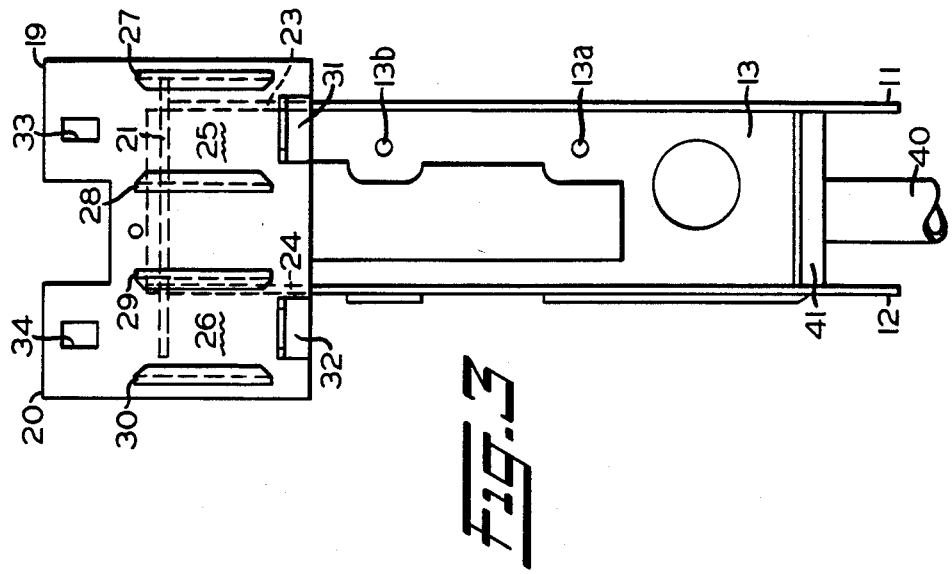
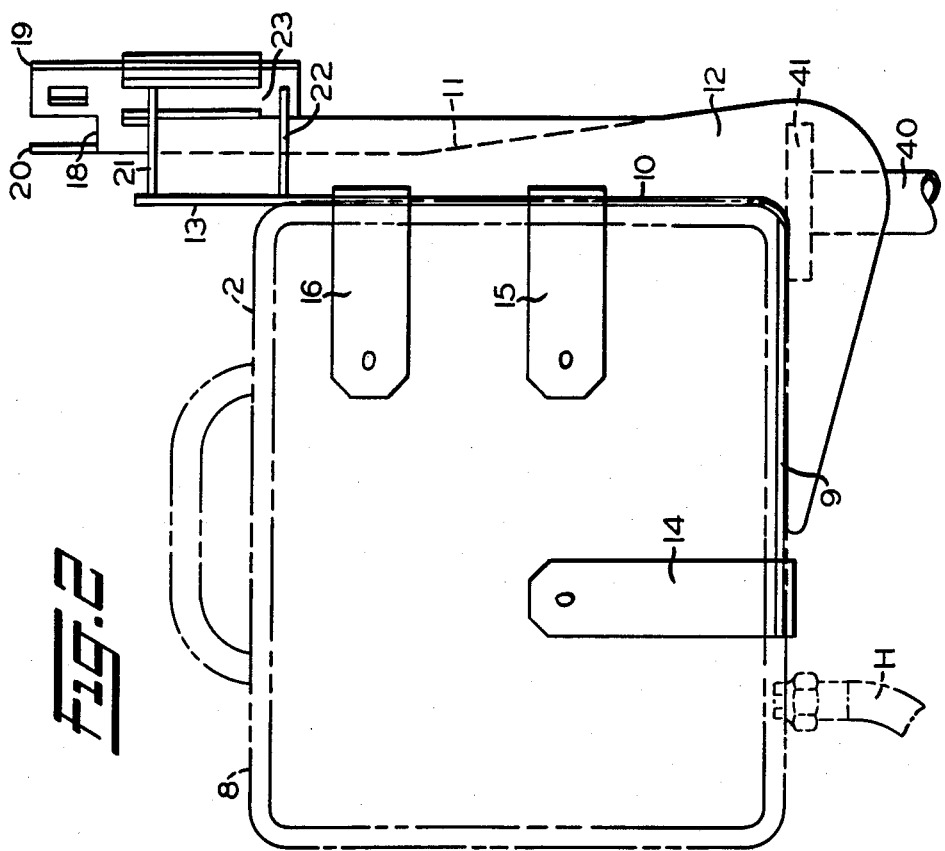
Fig. 3
Fig. 2

MOUNTING BRACKET FOR RAILWAY VEHICLE COUPLERS

FIELD OF THE INVENTION

This invention relates to a bracket for mounting equipment on railway vehicle couplers and, more particularly, to a mounting assembly including an L-shaped support clamped to the core holes of a railroad car coupler, a train monitor telemetry unit carried by the horizontal arm of the L-shaped support, and a detachable marker light unit attached to either one of two positions on a dual-faced plate which is secured to the vertical arm of the L-shaped support to ensure that the light rays are directed rearwardly regardless of the type of coupler.

BACKGROUND OF THE INVENTION

The railroad industry has recognized the potential of substantial cost savings by eliminating the caboose. However, the removal of cabooses from the ends of the freight trains has generated a need for certain equipment which is capable of sensing and monitoring the brake line pressure and which is able to ascertain the presence of the last car. That is, cabooseless operation has been made more practical by using a telemetry unit that mounts on the last car of the freight train. In practice, the telemetry equipment includes the electronics, R.F. transmitter, pressure transducer, and a battery which are all housed in an appropriate protective casing. It has been found that the ideal location for the equipment casing is on the open coupler of the last car since the glad-hand of the coupling hose is readily available for measuring the brake line pressure. Thus, a mounting bracket is ideally clamped to the webs between the core or relief holes formed on the guard arm side of the last coupler. In addition to the telemetry equipment, the Association of American Railroads (AAR) requires a flashing marker light to be carried on the end of the train. It has been found advantageous to provide a separate protective casing for the marker light and its battery in order to preserve the useful life of the battery of the telemetry unit.

In order to provide the most effective warning signal, the light rays emanating from the flashing marker unit should be projected directly rearward of the train. Thus, the face of the lens of the flashing signal light should be positioned perpendicular to the length of the railway tracks. Most of the railroads in the United States and Canada utilize one of the two types of car couplers, namely, either a type E coupler or a type F coupler. The contours of the guard arm surface and location of the core holes of the type E and F couplers are different so that the orientation of the telemetry and marker units, when attached to the respective coupler, is different. Positioning of the elemetry unit is not critical so long as helper engines in mountainous regions and switcher engines in classification may be freely coupled to the last car without having to remove the monitoring equipment. On the other hand, the mounting of the marker light unit is critical since it is necessary to orient and aim the flashing signal light toward the rear of the train. Thus, the mounting bracket must be provided with a dual-position marker light accommodating arrangement since the marker light must always be pointed directly rearward. In order to keep the system highly reliable, the dual-position mounting arrangement should not incorporate any moving parts.

OBJECTS AND SUMMARY OF THE INVENTION

Accordingly, it is an object of this invention to provide a new and improved mounting bracket for sensing and monitoring equipment for use on either type E or type F railway couplers.

Another object of this invention is to provide a unique mounting arrangement for carrying a telemetry unit and a marker light unit which are clamped to the last coupler of a freight train.

A further object of this invention is to provide a mounting bracket having a horizontal arm for carrying a telemetry unit and having a vertical arm provided with a dual-position plate for carrying a marker light unit which are clamped to the core holes formed on the guard arm side of the railway car coupler.

Still another object of this invention is to provide an improved end of train mounting assembly which includes a clamp having gripping portions for being inserted into core holes of a railroad vehicle coupler and includes an L-shaped bracket for supporting a telemetry equipment and a multi-faced bracket for carrying a marker light unit which directs a flashing signal light from the rear of the train.

Still a further object of this invention is to provide a unique coupler mount arrangement having a clamp device including gripping portions which are attached to the core holes of the last car coupler, a casing of a telemetry unit mounted on a horizontal arm of an L-shaped support member, a two-position carrier bracket attached to a vertical arm of the L-shaped support member for mounting a marker light unit in one of the two positions dependent upon the type of coupler carried by the last car.

Yet another object of this invention is to provide a bracket for mounting equipment on railway vehicle couplers comprising, first clamp means adapted to be clamped to a plurality of core holes formed in the railway vehicle coupler, second means connected to said first means for supporting a telemetry monitor unit, and third means including a dual-position mounting bracket connected to said second means for carrying a marker light unit which will project a warning signal substantially directly rearward of the last railway vehicle even when the bracket is mounted on different types of railway vehicle couplers.

Yet a further object of this invention is to provide a train monitor telemetry unit mounting bracket which is economical in cost, simple in design, easy to manufacture, efficient in service, reliable in operation, and durable in use.

BRIEF DESCRIPTION OF THE DRAWINGS

The above objects and other attendant features and advantages of the subject invention will become more readily evident from the foregoing detailed description when considered in conjunction with the accompanying drawings, wherein:

FIG. 2 is a partial rear elevational view of the supporting bracket with the telemetry unit shown in phantom;

FIG. 3 is a partial side elevational view of the dual-position supporting bracket without the telemetry and marker light units;

DETAILED DESCRIPTION OF THE INVENTION

Figure 1:
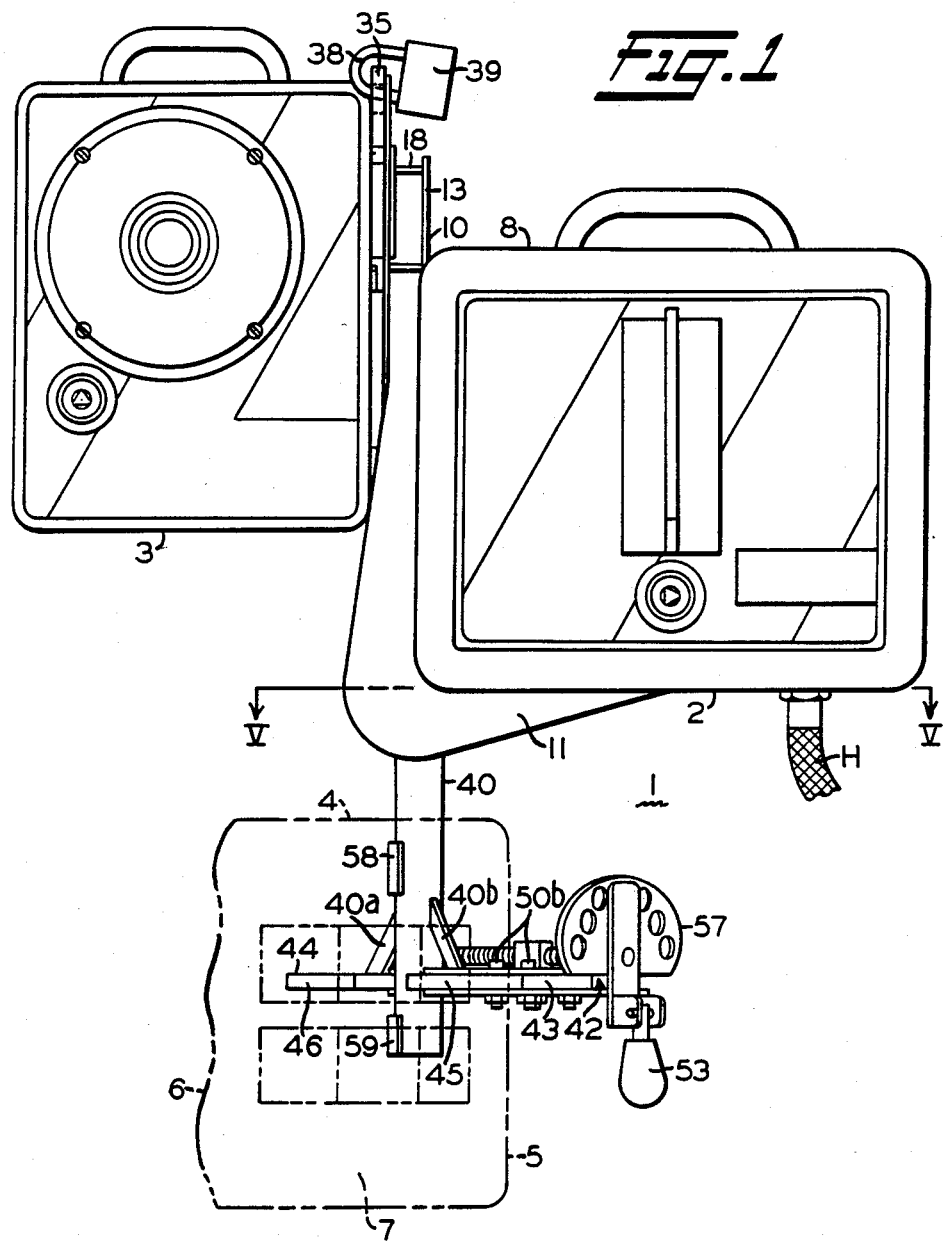
FIG. 1 is a front elevational view of a telemetry unit and market light unit mounted on a dual-position supporting bracket which is clamped to the side of the head of an open type E coupler of the last vehicle of a freight train.
Figure 5:
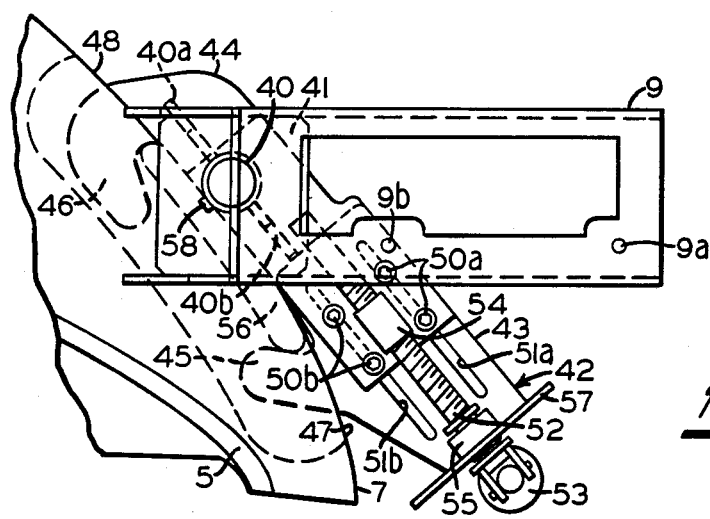
FIG. 5 is a sectional view taken along lines V—V of FIG. 1.

Referring now to the drawings, and in particular to FIG. 1, there is shown a mounting arrangement, generally characterized by numeral 1, for securely attaching the telemetry unit 2 and the marker light unit 3 to the type E coupler 4 of the last car of a freight train. There are two types of couplers used in freight train operation, namely, type E and type F couplers, which are shown and described in the Car and Locomotive Cyclopedia, Simmons-Boardman Publishing Corporation, pages 523-535, 1970. The coupler 4 includes a head portion 5 and a knuckle portion 6. The head 5 includes a vertical guard arm side surface 7 in which is formed a plurality of core or relief holes to lessen the weight of the couplers. The end-of-train sensing and monitoring equipment, namely, the telemetry unit 2, includes a lockable protective enclosure or casing 8 which contains the electronic components, radio frequency (RF) transmitter, pressure transducer, motion detector, battery, etc. the pressure transducer, which measures the brake pressure in the last car, is connected to the "glad-hand" of the end hose by a modified dummy "glad-hand" which is fitted to the end of a flexible coil hose H. As shown in FIG. 1 and 2, the casing 8 is supported by a horizontal arm 9 of an L-shaped supporting member 10 which is fabricated from sheet metal. A pair of spaced-apart L-shaped reinforcing ribs 11 and 12 are welded to the underside of horizontal arm 9 and to the outer side of a vertical arm 13 of the L-shaped bracket 10. As shown in FIG. 3, the reinforcing ribs 11 and 12 are positioned and welded to the outer edges of the horizontal and vertical arms 9 and 13 for extra strength and rigidity. As shown in FIGS. 2 and 3, a plurality of vertical and horizontal securing tabs 14, 15 and 16 are welded to the vertical and horizontal arms 9 and 13 and L-shaped rib 12. It will be seen that the extremities of each of the tabs is provided with a bolt hole which aligns with threaded holes in the casing 8. The casing 8 is also bolted to the L-shaped member at points 9a, 9b and 13a and 13b for being securely held in place, as shown in FIGS. 3 and 5.

Figure 4:
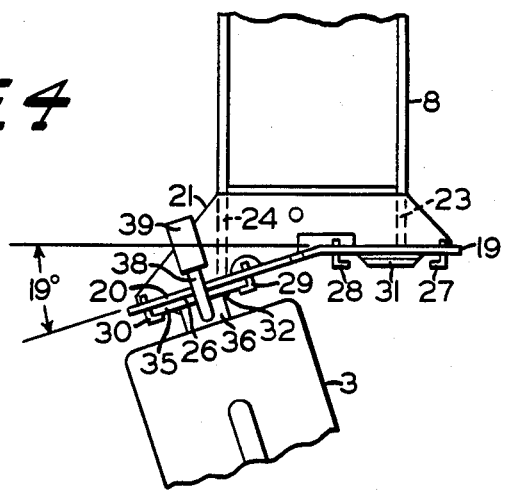
FIG. 4 is a partial top plan view of the bracket showing the angular offset of the two-position slide mounting plate.
Figure 6:
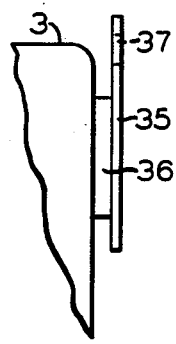
FIG. 6 is a partial side view of the marker light unit and slide mount plate.

As shown, the upper end of the vertical arm 13 carries a multi-position mounting plate or bracket 18 for supporting the marker light unit 3. The marker light mounting bracket is fabricated from a flat piece of sheet metal which is bent along its vertical centerline so that front side 19 is displaced from the rear side 20 by approximately nineteen degrees (19°), as shown in FIG. 4. It will be seen that mounting plate 18 is welded to a box-like structure formed by an upper plate 21, lower plate 22, and side plates 23 and 24 which are the upper portion of rib members 11 and 12 and which in turn are welded to the vertical arm 13. It will be noted that a pair of slide mounts 25 and 26 are formed on the sides 19 and 20, respectively. The slide mount 25 is formed by two facing elongated L-shaped channel pieces 27 and 28 which are vertically welded to the side plate 19 while the slide mount 26 is formed by two facing elongated L-shaped channel pieces 29 and 30 which are vertically welded to the side plate 20. A shelf or stop member 31 is welded to the side plate 19 at the lower extremity of slot 25 while a shelf or stop member 32 is welded to the side plate 20 at the lower extremity of slot 26. It will be seen that a pair of rectangular shackle receiving openings 33 and 34 are punched or stamped in the upper portion of side plates 19 and 20, respectively. As shown in FIGS. 1, 4 and 6, a slide plate 35 and a stand-off block 36 is secured to the right side marker casing 3 as viewed in FIGS. 1 and 6. The width of the plate member is substantially equal to the internal distance between channel members 27-28 and 29-30 while the width of the mounting block is less than the distance of the lips of the channel members. When the plate 35 is inserted into either slot 25 or 26, the lower edge of the plate is stopped by the shelf 31 or 32. In addition, the plate 35 has a hole 37 formed in the upper end which becomes aligned with either hole 33 or 34 so that the shackle 38 of a padlock 39 may be passed therethrough to lock and to prevent unauthorized removal of the marker light unit.

As shown, the upper end of a support post or pipe 40 is welded to an abutment plate 41 which, in turn, is welded to the reinforcing ribs 11 and 12. The lower portion of the upstanding post 40 carries a clamping device 42. In practice, the post 40 is directly welded to the clamping device 44 while a pair of strut members 40a and 40b are welded on opposite sides of the post 40 and to the upper side of the clamping device 42. The clamp 42 includes a pair of movable clamping arms or members 43 and 44. The clamping arm 43 includes an offset gripping tip or finger 45 while the clamping arm 44 includes an offset gripping tip or finger 46. The fingers 45 and 46 are adapted to fit in the core or relief holes 47 and 48 formed on the guard arm side of the standard type E (AAR) coupler 5 as in FIGS. 1 and 5. A plurality of bolts 50a and 50b are carried by clamping arm 44 and which are cooperatively associated with a pair of elongated slots formed in clamping member 43. As shown in FIG. 5, the two bolts 50a cooperate with slot 51a while the two bolts 50b cooperate with slot 51b to allow the arm 43 to slide with respect to arm 44 when an all thread bolt or rod 52 is turned by rotating a handle 53. As shown, a threaded apertured block 54 is carried by the clamping member 44 and a non-threaded apertured block is carried by the clamping member 43. Thus, slide arms are closed when handle 53 is rotated in the clockwise direction and are opened when the handle 53 is rotated in the counterclockwise direction. In practice, the gripping fingers 45 and 46 are placed into core holes 47 and 48 and the handle 53 is tightened until the clamping device rigidly grips the webbing 56 between the core holes. A locking plate 57 is carried by the arm 43 and includes a semicircular array of holes, each of which is adapted to accept the shackle of a switch-type of padlock. Thus, the opening and removal of the clamp is only permitted by authorized personnel. A pair of spaced-apart stabilizing or rest pads 58 and 59 are welded to the contact side of the supporting post 40. The contact pads engage the outer surface of the guard arm side of the coupler 4 to stabilize the mounting of the end-of-train monitoring equipment.

Thus, the end-of-train apparatus is easily and quickly clamped to the guard arm side of the last car coupler so that the brake line pressure may be continuously monitored and may be transmitted to the cab of the locomotive to keep the operator informed of the pressure condition and of the presence of the last vehicle of the train. Further, it will be seen that the side clamping arrangement keeps the buffing faces of the head 5 and knuckle 6 clear to allow coupling of a pusher locomotive or another railway car without change or damage to the end-of-train apparatus.

The mounting procedure for a type F car coupler is substantially the same, except that the marker light unit is slid and locked in the slot 25 so that the light rays emanating from the flashing signal lamp are projected directly to the rear of the last vehicle of the train.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substituations for components of the above specifically-described embodiment of the invention may be made by those skilled in the art without departing from the spirit and scope of the invention as set forth in the appended claims.

We claim:

1. A bracket for mounting equipment on railway vehicle couplers comprising, first clamp means adapted to be clamped to a plurality of core holes formed in a railway vehicle coupler, second means connected to said first clamp means for supporting a telemetry monitor unit, said second means includes an L-shaped support member having a plurality of vertical and horizontal tabs which are fixed securely to said telemetry monitor unit, said L-shaped support member includes a horizontally extending arm and a vertically extending arm which are reinforced by a pair of L-shaped rib members, and third means including a dual-position mounting bracket connected to said second means, said dual-position mounting bracket having a plate member which is attached to said vertically extending arm of said L-shaped support member, said plate member includes a first planar section and a second planar section which is at an obtuse angle to said first planar section, each of said first and second planar sections having a pair of channel pieces for carrying a marker light unit and for permitting said marker light unit to be moved to one of two positions so that said marker light unit will project a warning signal substantially directly rearward of the last railway vehicle even when the bracket is mounted on different types of railway vehicle couplers.

2. The bracket, as defined in claim 1, wherein said first means includes a plurality of hook portions which grip the inner vertical sides of the core holes.

3. The bracket, as defined in claim 1, wherein an upstanding post interconnects said first means to said second means.

4. The bracket, as defined in claim 1, wherein said marker light unit is locked onto said first or second planar section to prevent tampering or unwarranted removal.

5. The bracket, as defined in claim 1, wherein each of said first and second planar sections includes a bearing shelf for holing said marker light unit in place.

6. A bracket for mounting equipment on railway vehicle couplers comprising, first clamp means adapted to be clamped to a plurality of core holes formed in a railway vehicle coupler, second means connected to said first clamp means for supporting a telemetry monitor unit, said second means includes an L-shaped support member having a plurality of vertical and horizontal tabs which are fixed securely to said telemetry monitor unit, said L-shaped support member includes a horizontally extending arm and a vertically extending arm which are reinforced by a pair of L-shaped rib members, and third means including a dual-position mounting bracket connected to said second means for carrying a marker light unit which will project a warning signal substantially directly rearward of the 1st railway vehicle even when the bracket is mounted on different types of railway vehicle couplers, said dual-position mounting bracket having a plate member which is attached to said vertically extending arm of said L-shaped support member, said plate member includes a first planar section and a second planar section which is at an obtuse angle to said first planar section, said first planar section and the marker light unit include a slide mount for securing and for carrying said marker light unit to said first planar section so that said marker light unit will project a warning signal substantially directly rearward of the last railway vehicle when the railway vehicle coupler is of one type.

7. A bracket for mounting equipment on railway vehicle couplers comprising, first clamp means adapted to be clamped to a plurality of core holes formed in a railway vehicle coupler, second means connected to said first clamp means for supporting a telemetry monitor unit, said second means includes an L-shaped support member having a plurality of vertical and horizontal tabs which are fixed securely to said telemetry monitor unit, said L-shaped support member includes a horizontally extending arm and a vertically extending arm which are reinforced by a pair of L-shaped rib members, and third means including a dual-position mounting bracket connected to said second means for carrying a marker light unit which will project a warning signal substantially directly rearward of the last railway vehicle even when the bracket is mounted on different types of railway vehicle couplers, said dual-position mounting bracket having a plate member which is attached to said vertically extending arm of said L-shaped support member, said plate member includes a first planar section and a second planar section which is at an obtuse angle to said first planar section, said second planar section and the marker light unit include a slide mount for securing and for carrying said marker light unit to said second planar section so that said marker light unit will project a warning signal substantially directly rearward of the last railway vehicle when the railway vehicle coupler is of one type.

* * * * *

UNITED STATES PATENT AND TRADEMARK OFFICE
CERTIFICATE OF CORRECTION

PATENT NO. : 4,665,858
DATED : May 19, 1987
INVENTOR(S) : Ronald E. Harrigal and James P. Chew It is certified that error appears in the above-identified patent and that said Letters Patent are hereby corrected as shown below:

Column 6, line 5, delete "holing" and insert --holding-- line 20, delete "1st" and insert --last--

Signed and Sealed this

Twenty-fourth Day of May, 1988

Attest:

DONALD J. QUIGG

Attesting Officer

Commissioner of Patents and Trademarks